United States Patent [19]

Yano

[11] Patent Number: 5,696,523

[45] Date of Patent: Dec. 9, 1997

[54] PLASMA ADDRESSED DISPLAY DEVICE

[75] Inventor: Tomoya Yano, Kanagawa, Japan

[73] Assignee: Sony Corporation, Tokyo, Japan

[21] Appl. No.: 633,446

[22] Filed: Apr. 17, 1996

[30] Foreign Application Priority Data

Apr. 17, 1995 [JP] Japan .................. 7-090550

[51] Int. Cl.$^6$ .............. G09G 3/28; G02F 1/133
[52] U.S. Cl. .............. 345/60; 349/32; 345/87
[58] Field of Search .......... 349/32, 41; 345/60, 345/87, 94

[56] References Cited

U.S. PATENT DOCUMENTS

| | | | |
|---|---|---|---|
| 4,896,149 | 1/1990 | Buzak et al. | 345/60 |
| 5,077,553 | 12/1991 | Buzak | 345/60 |
| 5,272,472 | 12/1993 | Buzak | 345/60 |
| 5,349,454 | 9/1994 | Iwama | 345/60 |
| 5,349,455 | 9/1994 | Hayashi et al. | 349/32 |
| 5,420,707 | 5/1995 | Miyazaki | 349/32 |
| 5,461,395 | 10/1995 | Stein | 345/60 |
| 5,499,122 | 3/1996 | Yano | 349/32 |
| 5,548,421 | 8/1996 | Miyazaki | 349/31 |
| 5,596,431 | 1/1997 | Bongaerts et al. | 345/60 |

*Primary Examiner*—Richard Hjerpe
*Assistant Examiner*—Paul A. Bell
*Attorney, Agent, or Firm*—Hill, Steadman & Simpson

[57] ABSTRACT

A plasma display device which can stabilize the state of discharge in a plasma chamber includes a transparent electrode 32 supplied with an anode potential formed on a glass substrate 17; and stripe-like insulation layers 31a to 31c, column electrodes 19a to 19c supplied with the cathode potential, and insulation layers 20a to 20c sequentially formed on the transparent electrode 32. On the insulation layers 20a to 20c, a dielectric sheet 13, a liquid crystal layer 16, and a data electrode 15 are sequentially formed. In the plasma chambers 18a and 18b, an ionizable gas such as helium is sealed.

13 Claims, 10 Drawing Sheets

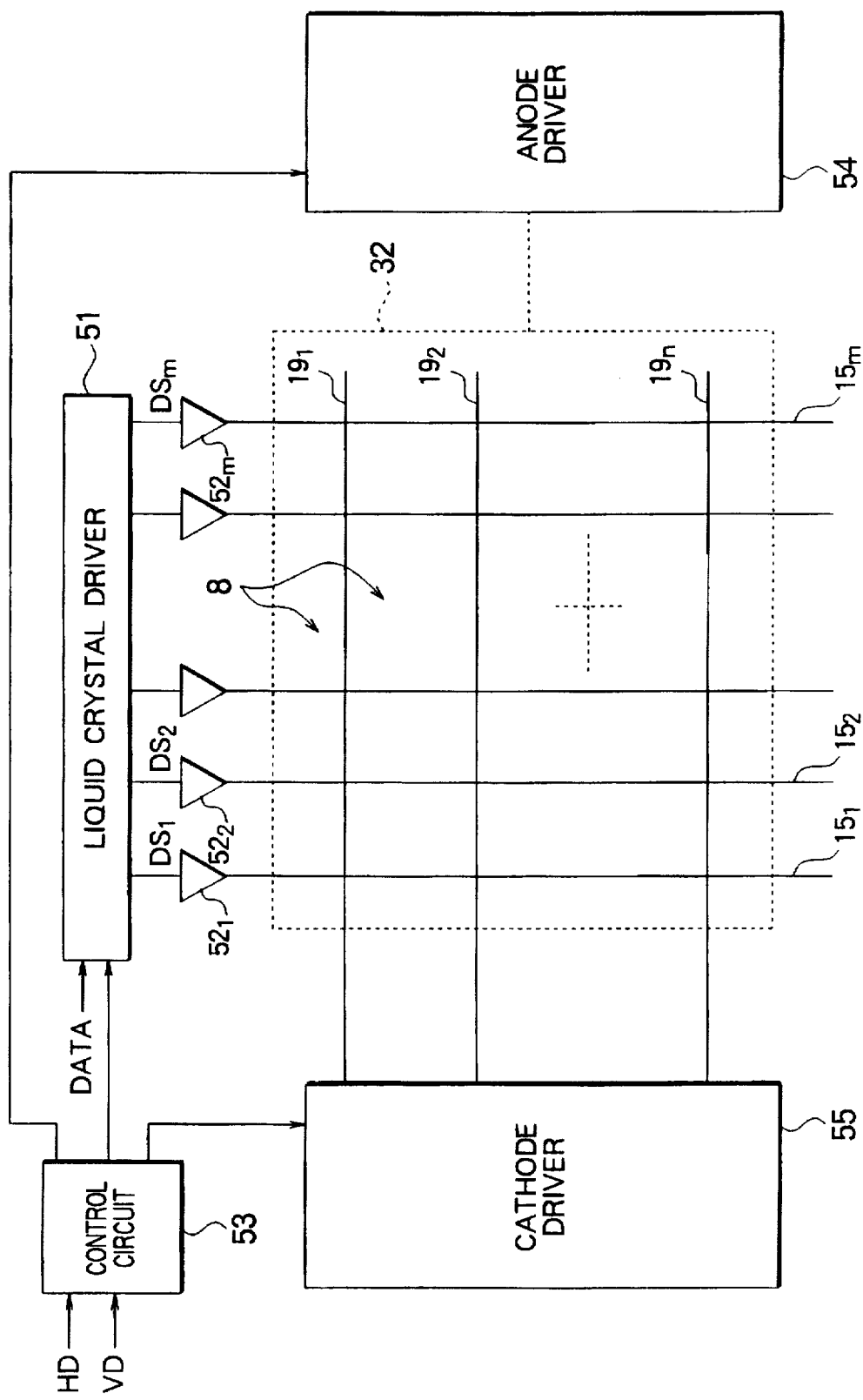

PLASMA ADDRESSED DISPLAY DEVICE

BACKGROUND OF THE INVENTION

1. Field of the Invention

The present invention relates to a plasma addressed electro-optic device and, in particular, to an electrode structure for the plasma discharge chamber of the plasma addressed electro-optic device.

2. Description of the Related Art

Conventionally, as a means of achieving a high resolution and high contrast of an electro-optic device of a matrix type using a liquid crystal cell as the electro-optic cell, for example, a liquid crystal display device, an active matrix addressed system wherein a switching element such as a thin film transistor is provided for every pixel and this is linearly driven has been generally known.

However, in this case, there is a shortcoming in that it is necessary to provide a large number of semiconductor elements such as thin film transistors on the substrate and, particularly when the surface area is increased, the manufacturing yield becomes poor.

For this reason, recently, the system has been proposed of utilizing switches based on plasma discharge in place of switching elements such as thin film transistors and thereby utilizing plasma switches for driving the electro-optic cell.

FIG. 6 is a view of the cross-sectional configuration of a conventional plasma addressed display device 100.

As shown in FIG. 6, the plasma addressed display device 100 has a flat panel structure comprised of a liquid crystal cell 1 and a plasma cell 2 superposed on each other and a dielectric sheet 3 interposed between them.

The liquid crystal cell 1 has a plurality of data electrodes (referred to as row electrodes) 5 which are provided in a direction perpendicular to the paper surface in drawing FIG. 6 at predetermined intervals and which extend in a horizontal direction. A liquid crystal layer 6 is interposed between the dielectric sheet 3 and the data electrodes 5 and is filled with a liquid crystal material.

The plasma cell 2 includes a glass substrate 7, plasma chambers 8a, column electrodes 9a to 9c, and insulation layers 10a to 10c.

On the glass substrate 7 in FIG. 6, layers formed by sequentially stacking the column electrodes 9a to 9c and the insulation layers 10a to 10c are formed at predetermined intervals in the horizontal direction in the figure in a stripe-like pattern extending in a direction perpendicular to the paper surface of the drawing.

In the plasma chambers 8a and 8b that are individually sealed by the dielectric sheet 3, glass substrate 7, column electrodes 9a to 9c, and the insulation layers 10a to 10c is sealed an ionizable gas. This gas may be, for example, helium, neon, argon, a mixture of these gases, etc.

Since the plasma addressed display device 100 as shown in FIG. 6 is formed by stacking the column electrodes 9a to 9c and the insulation layers 10a to 10c, the aperture ratio of the pixels can be improved.

FIG. 7 is a view for explaining the driving portion of the column electrodes of the plasma addressed display device 100 shown in FIG. 6.

As shown in FIG. 7, a plurality of column electrodes $9A_1$ to $9A_N$ are commonly connected to an anode driver 40 to serve as anode electrodes. Also, a plurality of column electrodes $9K_1$ to $9K_{N-1}$ are connected to a cathode driver 41 to serve as cathode electrodes.

Particularly, in the plasma addressed display device 100, the anode electrodes and the cathode electrodes are provided alternately.

The column electrodes $9K_1$ to $9K_{N-1}$ which serve as the cathode electrodes are supplied with a cathode potential having a predetermined potential difference from the anode potential for every frame and within every successive horizontal period (1H), respectively. Due to this, the plasma chambers for generating a plasma discharge are sequentially scanned. Also, the data voltage applied to the data electrodes $5_1$ to $5_m$ is inverted in its polarity at every horizontal period and every frame with respect to the anode potential so that the liquid crystal layer 6 shown in FIG. 6 is alternately driven.

As shown in FIG. 7, the column electrodes $9K_1$ to $9K_{N-1}$ and the column electrodes $9A_1$ to $9A_N$ are led out from the opposite sides so as to reduce the influence of the voltage drop at the end portions due to the electrode resistance.

FIG. 8 is a view for explaining the voltage drop in the column electrodes $9K_1$ to $9K_{N-1}$ and the column electrodes $9A_1$ to $9A_N$.

As shown in FIG. 8, in the column electrodes $9A_1$ to $9A_N$, the potential is "0V" at the connection portions of the anode driver 40, but the potential 40a falls from the connection portions to the front end portions.

Also, in the column electrodes $9K_1$ to $9K_{N-1}$, the potential is "-300V" at the connection portions of the cathode driver 41, but the absolute value of the potential 41a falls from the connection portions to the front end portions.

In the plasma addressed display device 100 shown in FIG. 7, the column electrodes $9K_1$ to $9K_{N-1}$ and the column electrodes $9A_1$ to $9A_N$ are led out from the opposite sides so as to make the fluctuation of the potential difference $\Delta V$ between the column electrodes $9K_1$ to $9K_{N-1}$ and the column electrodes $9A_1$ to $9A_N$ small even if a voltage drop occurs.

In the above configuration, when a predetermined voltage is applied between for example the column electrode 9a and the column electrode 9b for the plasma chamber 8a shown in FIG. 6, the column electrode 9a and the column electrode 9b serve as the cathode and anode, respectively, and the part of the gas in the plasma chamber 8a is selectively ionized to generate a plasma discharge and the internal portion thereof is maintained at substantially the anode potential. When the data voltage is applied to the data electrode 5 in this state, the data voltage is written in the liquid crystal layer 6 at the pixel corresponding to the plasma chamber 8a via the dielectric sheet 3. When the plasma discharge is terminated, the plasma chamber 8a is at a floating potential, and the voltage written in the liquid crystal layer 6 at the corresponding pixel is held until the next write period (for example after one frame). At this time, the plasma chamber 8a serves as a sampling switch, and the liquid crystal layer 6 at each pixel serves as a sampling capacitor.

By the operation of the liquid crystal by the data voltage written from the data electrode 15 to the liquid crystal layer 6 at the pixels, the display is carried out in pixel-by-pixel. Accordingly, by sequentially scanning a pair of plasma chambers in the row direction, which write the data voltage in the liquid crystal layer 6 at a plurality of pixels aligned in the column direction by generating a plasma discharge, the display of a two-dimensional image can be carried out.

However, in the plasma addressed display device 100 shown in FIG. 6, to improve the aperture ratio, as mentioned above, the column electrodes 9a to 9c and the insulation layers 10a to 10c are sequentially stacked on the glass substrate 7. Therefore, in comparison with the distance between the column electrode 9a and the column electrode 9b, the distance between the column electrodes 9a and 9b and the data electrode 5 sometimes becomes less. For this reason, the electric field in the plasma chamber 8a is greatly influenced by the potential of the data electrode 5 in addition to the potential of the column electrodes 9a and 9b.

As a result, there is the problem that, when the potential of the data electrode 5 becomes negative, the electric field in the plasma chamber 8a becomes weak, the plasma discharge is suppressed, the potential in the plasma chamber 8a becomes unstable, and therefore voltage applied to the liquid crystal layer 6 becomes unstable.

For example, when the potentials applied to the column electrodes 9a and 9b and the data electrode 5 are the potentials "−300V", "0V", and "+80V" as shown in FIG. 9(A), the potential of the lower surface of the dielectric sheet 3 becomes "0V", a discharge occurs in the plasma chamber 8a in accordance with the potential difference between the column electrode 9a and the column electrode 9b, and the data in accordance with the potential of the data electrode 5 is written.

Thereafter, so as to alternately drive the liquid crystal layer 6, as shown in FIG. 9(B), when "−80V" is applied to the data electrode 5 as the data voltage, the potential of the lower surface of the dielectric sheet 3 becomes "−160V". At this time, the discharge state in the plasma chamber 8a is influenced not only by the potential difference between the column electrode 9a and the column electrode 9b, but also by the potential "−160V" of the lower surface of the dielectric sheet 3, and the plasma discharge in the plasma chamber 8a is suppressed.

Also, in the plasma addressed display device 100, as shown in FIG. 7, since the column electrodes $9K_1$ to $9K_{N-1}$ and the column electrodes $9A_1$ to $9A_N$ are led out from opposite sides, there arise the problems that the configuration of the driving portion becomes complex and, at the same time, when the screen is enlarged, the effect of the voltage drop due to the electrode resistance becomes large.

Also, when the plasma addressed display device is driven, to prevent the direct current (DC) component from being applied to the liquid crystal layer 6, it is necessary to eliminate the direct current component. That is, this is because of the problem that image burn-in, etc. occurs when a direct current component is applied to the liquid crystal layer 6.

However, in the plasma addressed display device 100 mentioned before, there is the following problem when trying to prevent the direct current component from being applied to the liquid crystal layer 6.

FIG. 10 is a view showing the equivalent circuit of one pixel's worth of the plasma addressed display device 100 shown in FIGS. 6 and 7.

In FIG. 10, DS denotes a data voltage; $R_{LC}$ and $C_{LC}$ denote a resistor and a capacitor of the liquid crystal layer 6, respectively; $R_G$ and $C_G$ denote a resistor and capacitor of the dielectric sheet 3, respectively; SW1 denotes a virtual switch constituted by the plasma chamber 8a; VB, a direct current source; R, a resistor for restricting the current; and SW2, a switch for applying a predetermined voltage between the column electrodes 9a and 9b.

By turning on the switch SW2, a predetermined voltage is applied between the column electrodes 9a and 9b, a plasma discharge occurs in the column electrode 8a, the virtual switch SW1 turns on, and a voltage proportional to the data voltage DS is applied to the liquid crystal layer 6 via the dielectric sheet 3.

In this case, the virtual switch SW1 does not operate as a simple switch, but has a DC offset. Namely, the data voltage written in the liquid crystal layer 6 reflects the field distribution in the plasma chamber 8a immediately after the termination of the plasma discharge. At this time, when there is a potential difference between the column electrode 9a and the column electrode 9b, an electric field is generated not only in the horizontal direction in FIG. 6, but also in the perpendicular direction (the thickness direction). Accordingly, after the termination of the discharge, the potential of the lower surface of the dielectric sheet 3 in the figure has become a potential lower than the anode potential of the column electrode 9b, that is, an intermediate potential between the anode potential and the cathode potential due to this electric field in the perpendicular direction. For this reason, when the data voltage DS is applied to the data electrode 5, that is, writing is carried out, in such a state, the potential difference between the upper surface of the liquid crystal layer 6 and the lower surface of the dielectric sheet 3 becomes the potential difference between the data voltage DS and the intermediate potential, and there is a problem that there is no potential difference between the data voltage DS and the anode potential.

This means that the writing is carried out in a state where a DC offset corresponding to the potential difference between the intermediate potential and the anode potential is superimposed on the data voltage DS.

Note that development work is being undertaken on a plasma display device in which stripe-like transparent film electrodes serving as the anode electrodes are formed in the valid pixel regions of the plasma chambers. In this plasma addressed display device, ITO for example is used as the material of the transparent electrodes to be used as the column electrodes, and the surface resistance where the ITO is formed as a film on the glass substrate 7 by vapor deposition or sputtering or the like becomes 10 to 100 Ω/□ (ohms per square). Also, when the ITO is formed in a stripe-like pattern having for example a surface resistance of 10 Ω/□, a width of 0.5 mm, and a length of 300 mm, the electrode resistance per line becomes 6 KΩ. When DC (direct current) discharge is carried out by these electrodes and a discharge current of 100 mA flows, where the current density is uniform, the voltage drop between the connection portions of the driver and the electrode end portions is about 300V and the state of discharge in the different plasma chambers cannot be made uniform.

Note that ITO is an indium oxide doped with tin as a hetero-additive.

SUMMARY OF THE INVENTION

The present invention was made in consideration with the problems as mentioned above and has as an object thereof to provide a plasma addressed display device which can reduce the effect due to the voltage drop of the cathode electrodes and the anode electrodes by a simple structure.

Also, another object of the present invention is to provide a plasma addressed display device which can stabilize the state of the discharge in the different plasma chambers.

Further, still another object of the present invention is to provide a plasma addressed display device which can prevent or reduce the superimposition of the DC offset at the time of writing of the data voltage.

So as to solve the problems of the related art mentioned above and achieve the above objects, the plasma addressed display device of the present invention comprises a transparent electrode film which is formed on a substrate surface within a predetermined area and serves as an anode electrode; a plurality of first electrodes which serve as cathode electrodes and are formed in a column direction in the form of stripes; a plurality of insulation layers in the form of stripes formed between the first electrodes and the surface of the transparent electrode film; a plurality of plasma chambers which are provided in the form of stripes between the first electrodes arranged in the column direction and in which a dischargeable gas is sealed; an electro-optic material layer which is provided on a side opposite to the transparent electrode film with respect to the plasma chambers and which is driven by a potential difference across the two ends; a dielectric sheet provided between one side of the electro-optic material layer and the plasma chambers; and second electrodes which are provided on the other end of the electro-optic material layer so as to be substantially orthogonal to the first electrodes and are supplied with a data voltage.

Also, in the plasma addressed display device of the present invention, preferably the potential setting sheet is a dielectric sheet.

Also, in the plasma addressed display device of the present invention, preferably the distance between the first electrodes and the transparent electrode film is shorter than the distance between the first electrodes and the second electrodes.

Also, in the plasma addressed display device of the present invention, preferably the transparent electrode is formed on substantially the entire surface of the substrate.

Also, in the plasma addressed display device of the present invention, preferably a reference voltage for driving the electro-optic material layer is applied to the transparent electrode film.

Also, in the plasma addressed display device of the present invention, preferably the discharge in the plasma chamber is a direct current discharge and the first electrodes are exposed in the plasma chambers.

Also, in the plasma addressed display device of the present invention, preferably the discharge in the plasma chamber is an alternate current discharge and the first electrodes are embedded inside the insulation layers.

In the plasma addressed display device of the present invention, the transparent electrode film and the first electrode serve as the anode electrode and cathode electrode, respectively, and the electric field in the plasma chamber, in a state where a cathode pulse is applied to the cathode electrodes, is determined mainly by the relationship between the first electrode and the transparent electrode film. That is, it is determined by the magnitude of the capacitive coupling between the first electrode and the transparent electrode film. At this time, by driving the electro-optic material layer by an alternate current, there will be fluctuations of the potential of the first electrode, but these will have little influence upon the electric field in the plasma chamber.

Also, after the termination of the discharge in the plasma chambers, the voltage to be finally held is determined by the action of the charge ionized from the semi-stable atoms. At this time, the voltage written in the potential setting sheet reflects the electric field in the plasma chamber, but since the transparent electrode film is formed on the substrate surface, the magnitude of the electric field generated in the thickness direction (the perpendicular direction) in the plasma chamber is small. For this reason, it is possible to keep writing from being carried out in a state where, for example, when the potential of the first electrode is switched from the cathode potential to the anode potential, the DC offset generated due to the electric field in the thickness direction in the plasma chamber is superimposed on the data voltage of the second electrode.

Also, in the plasma addressed display device of the present invention, the discharge current flows also in the direction orthogonal to the channel region in the plasma chamber, but by forming the transparent electrode film on substantially the entire surface of the substrate including for example the valid pixel region, in comparison with a case where the transparent electrode film is formed in the form of stripes, the resistance value of the transparent electrode film in the direction orthogonal to the channel region can be lowered. For this reason, the voltage drop in the direction orthogonal to the channel region can be reduced. For this reason, the influence of the voltage drop in the direction orthogonal to the channel region in a case where the scale of the device becomes large can be effectively suppressed.

BRIEF DESCRIPTION OF THE DRAWINGS

FIG. 3 is a schematic block diagram for explaining driving of column electrodes of the plasma addressed display device shown in FIG. 1.

DETAILED DESCRIPTION OF THE PREFERRED EMBODIMENTS

Below, an explanation will be made of a plasma addressed display device according to an embodiment of the present invention.

Figure 1:
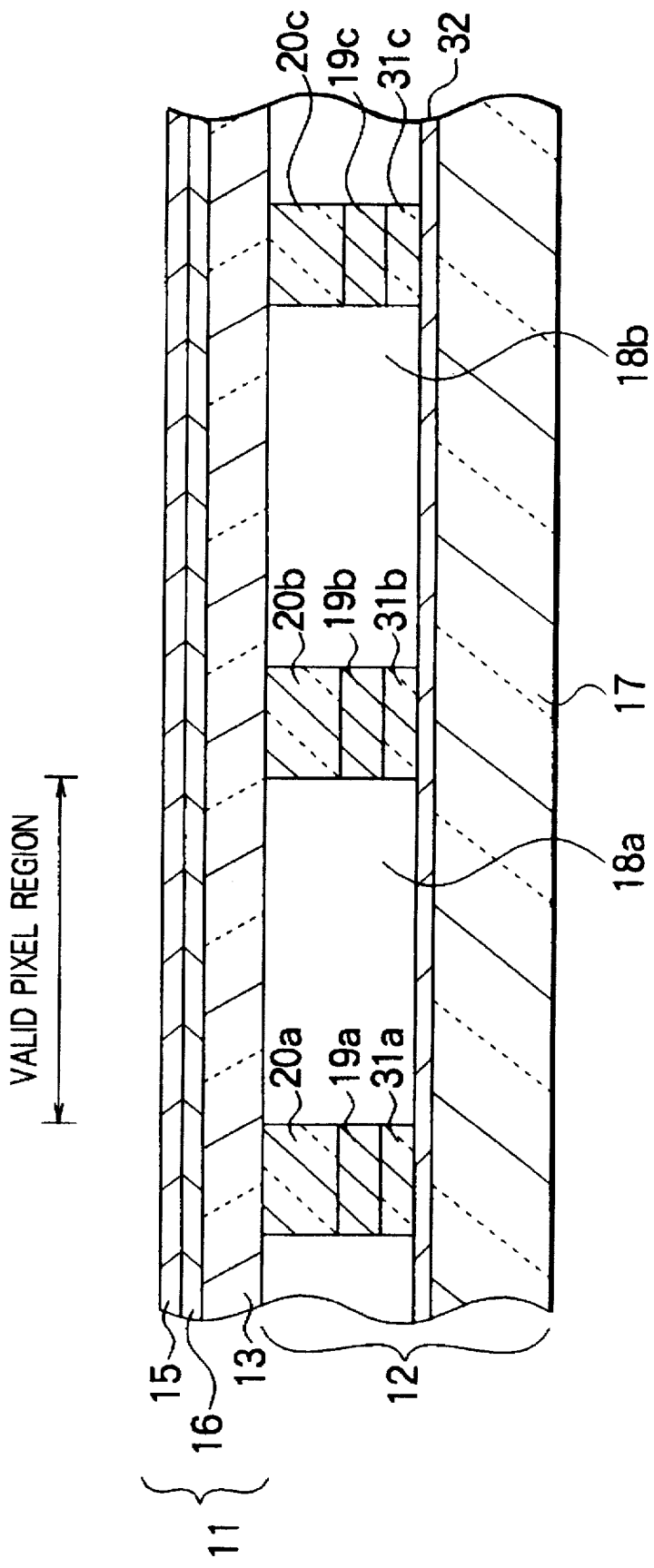
FIG. 1 is a side view of the cross-sectional configuration of a plasma addressed display device according to an embodiment of the present invention.

FIG. 1 is a view of the cross-sectional configuration of a plasma addressed display device 21 according to the present embodiment.

As shown in FIG. 1, the plasma addressed display device 21 has a flat panel structure comprised of a liquid crystal cell 11 and a plasma cell 12 superposed on each other, and a dielectric sheet 13 interposed between them.

The liquid crystal cell 11 has a plurality of data electrodes (referred to as row electrodes) 15 which are provided in the direction perpendicular to the paper surface in FIG. 1 at predetermined intervals extending in the horizontal direction. A liquid crystal layer 16 serving as the electro-optic material layer is interposed between the dielectric sheet 13 as the potential setting sheet and the data electrodes 15 and is filled with a liquid crystal material.

As the potential setting sheet, a thin glass sheet is used as the dielectric sheet, for example.

The plasma cell 12 is constituted by a glass substrate 17, column electrodes 19a to 19c, insulation layers 20a to 20c, insulation layers 31a to 31c, plasma chambers 18a and 18b arranged in the form of a matrix, and a transparent electrode film 32.

The transparent electrode film 32 has a thickness of about 0.1 to 0.2 μm and is formed on the entire surface of, for example, the glass substrate 17. The transparent electrode film 32 has applied thereto, as a reference potential, for example "0V", which is the driving reference potential of the liquid crystal cell. The transparent electrode film 32 is of ITO or a sintered form of tin oxide doped with antimony as a hetero-additive.

On the transparent electrode film 32, stripe-like layers extending in the direction perpendicular to the paper surface comprising the insulation layers 31a to 31c, the column electrodes 19a to 19c, and the insulation layers 20a to 20c in that order are formed in the horizontal direction in the figure at predetermined intervals by screen printing, etc. The column electrodes 19a to 19c are formed exposed in the plasma chambers 18a and 18b.

An ionizable gas is sealed in the plasma chambers 18a and 18b which are individually sealed by the dielectric sheet 13, the glass substrate 17, the insulation layers 31a to 31c, the column electrodes 19a to 19c, and the insulation layers 20a to 20c. As this gas, for example helium, neon, argon, a mixture of the same, etc. are used.

The insulation layers 20a to 20c and the insulation layers 31a to 31c are formed by screen printing using a glass paste, silicon dioxide $SiO_2$, silicon nitride $Si_3N_4$, or the like. The insulation layers 31a to 31c have a thickness of about 20 to 30 μm so as to have a dielectric breakdown strength of, for example, about "300V".

Also, the column electrodes 19a to 19c are formed by screen printing using a glass paste, nickel Ni, aluminum Al, or the like.

The plasma addressed display device 21 is fabricated by forming the transparent electrode film 32 on the entire surface of the rear glass substrate 17, and then sequentially forming the insulation layers 31a to 31c, the column electrodes 19a to 19c, and the insulation layers 20a to 20c by screen printing, laminating the stacked layers of the dielectric sheet 23, the liquid crystal layer 16, and the data electrodes 15 to each other, and then filling the liquid crystal layer 16 with the liquid crystal material.

Figure 2:
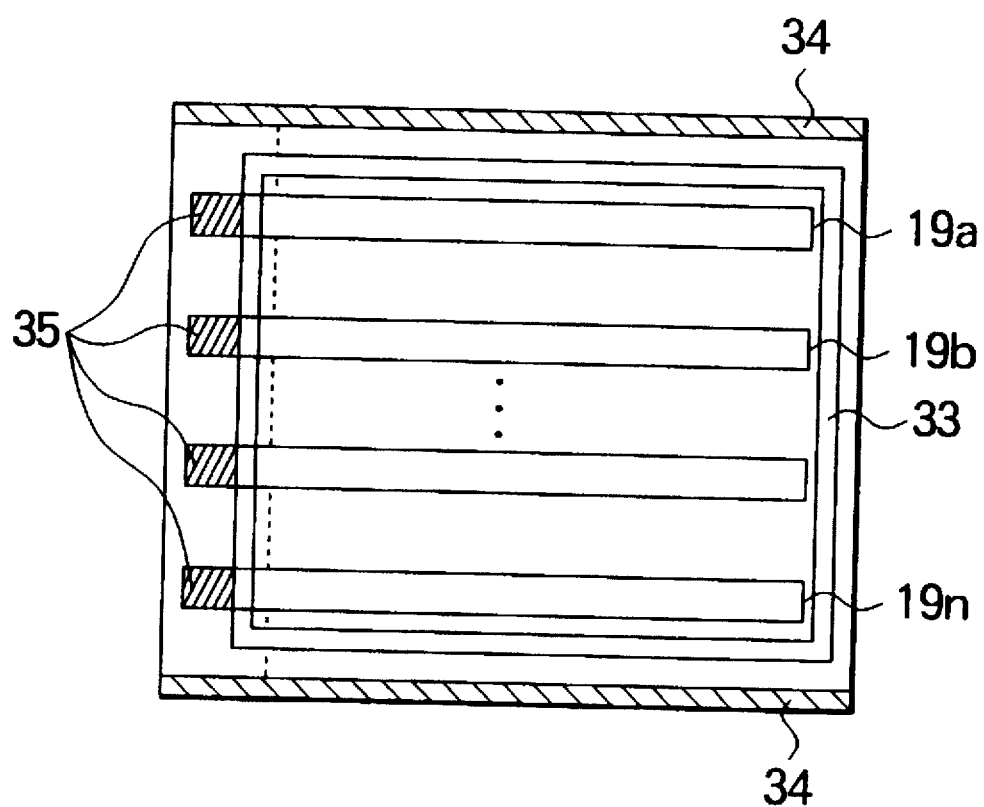
FIG. 2 is a plan view for explaining the configuration of the plasma addressed display device shown in FIG. 1.

FIG. 2 is a view for explaining the configuration of the plasma addressed display device 21 on the flat plane side.

As shown in FIG. 2, at the peripheral portions of the glass substrate 17 on which the transparent electrode film 32 shown in FIG. 1 is formed, a frit seal 33 which uses a low melting point glass, etc. is arranged along the peripheral portions so that the transparent electrode film 32 and the dielectric sheet 13 as shown in FIG. 1 are tightly bonded.

Also, at a part of the frit seal 33 which does not form the valid pixel region, a common terminal 34 of the transparent electrode film 32 shown in FIG. 1 is provided. Terminals 35 are provided at the left side ends of the column electrodes 19a to 19n in the figure. The common terminal 34 is formed by screen printing, for example, in the same way as the column electrodes 19a to 19n.

In the plasma addressed display device 21 shown in FIGS. 1 and 2, since the column electrodes 19a to 19c are formed between the insulation layers 20a to 20c and the insulation layers 31a to 31c, the aperture ratio of the pixels can be improved.

Also, since the common terminal 34 is formed in a part which is not the valid pixel region, the width of the common terminal 34 can be made sufficiently wide and the resistance value of the common terminal 34 can be made small in comparison with the column electrodes 19a to 19n.

In the above configuration, when a predetermined voltage is applied to the column electrode 19b and the transparent electrode film 32 on the rear substrate has a reference potential "0V", the column electrode 19 serves as the cathode, and the column electrodes 19a and 19c and the transparent electrode film 32 serve as the anode. Due to this, portions of the gas in the plasma chambers 18a and 18b are selectively ionized and a plasma discharge (a direct current discharge) is generated, and the internal portions of the chamber are maintained at substantially an anode potential. When the data voltage is applied to the data electrode 15 in this state, the data voltage is written in the liquid crystal layer 16 at the pixels corresponding to the plasma chambers 18a and 18b via the dielectric sheet 13. When the plasma discharge is terminated, the plasma chambers 18a and 18b are at a floating potential, and the voltage written in the liquid crystal layer 16 at the pixel corresponding to the plasma chamber 18b is held until the next write period (for example, after one frame). On the other hand, the voltage written in the plasma chamber 18a is rewritten when the column electrode 19a is scanned next to the column electrode 19b.

In such an operation, the plasma chambers 18a and 18b serve as the sampling switches, and the liquid crystal layer 16 and the dielectric sheet 13 at the respective pixels serve as the sampling capacitors.

In the plasma addressed display device 21, for example when the pulse signal for the cathode is applied to the column electrode 19b, the electric field in the plasma chambers 18a and 18b is determined mainly by the relationship between the column electrode 19b and the transparent electrode film 32. For this reason, in the plasma addressed display device 21, the fluctuation of the electric field in a plasma chamber due to the voltage applied to the data electrode 15 can be reduced in comparison with the conventional plasma addressed display device. For this reason, the discharge state of the plasma chambers can be made stable.

Figure 9A:
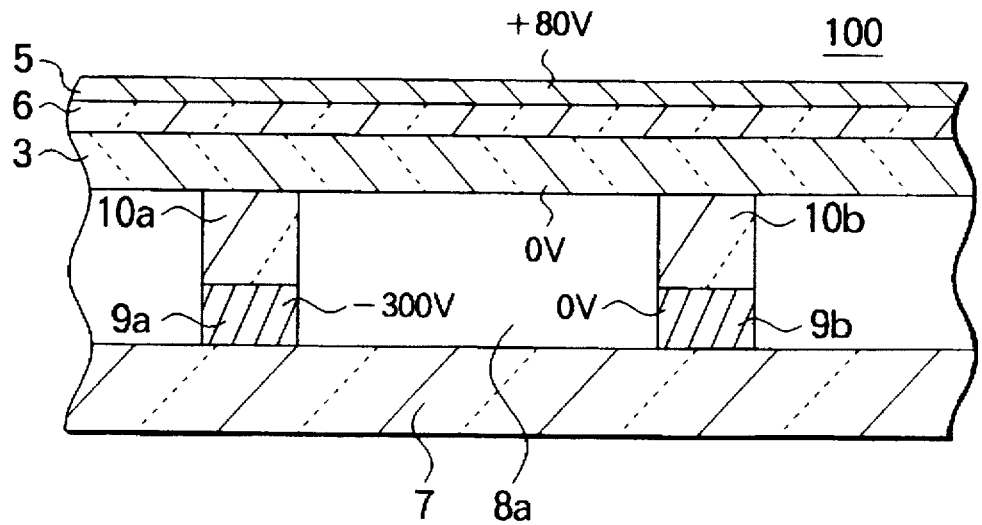
FIGS. 9A and 9B are cross-sectional views for explaining the voltage to be applied to the column electrodes and the data electrodes of the plasma addressed display device shown in FIG. 6.
Figure 9B:
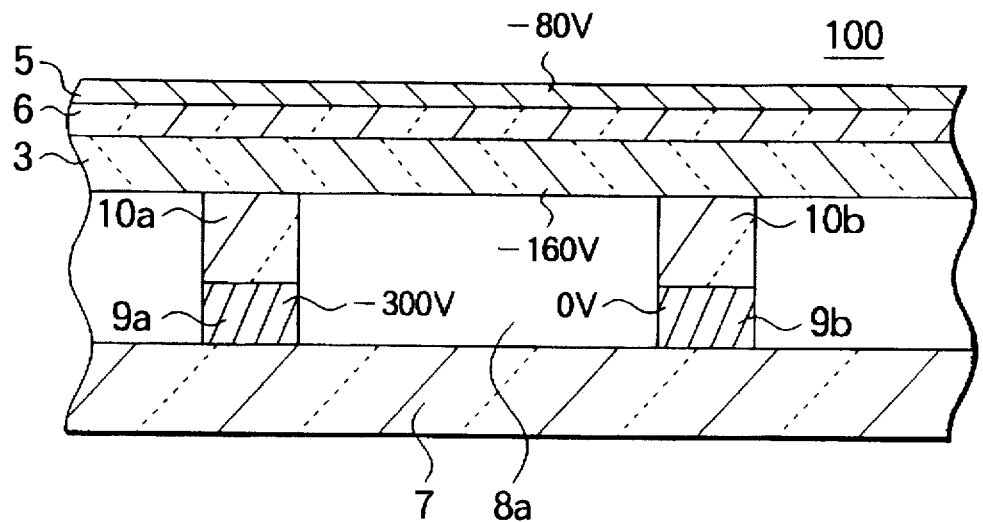
Figure 10:
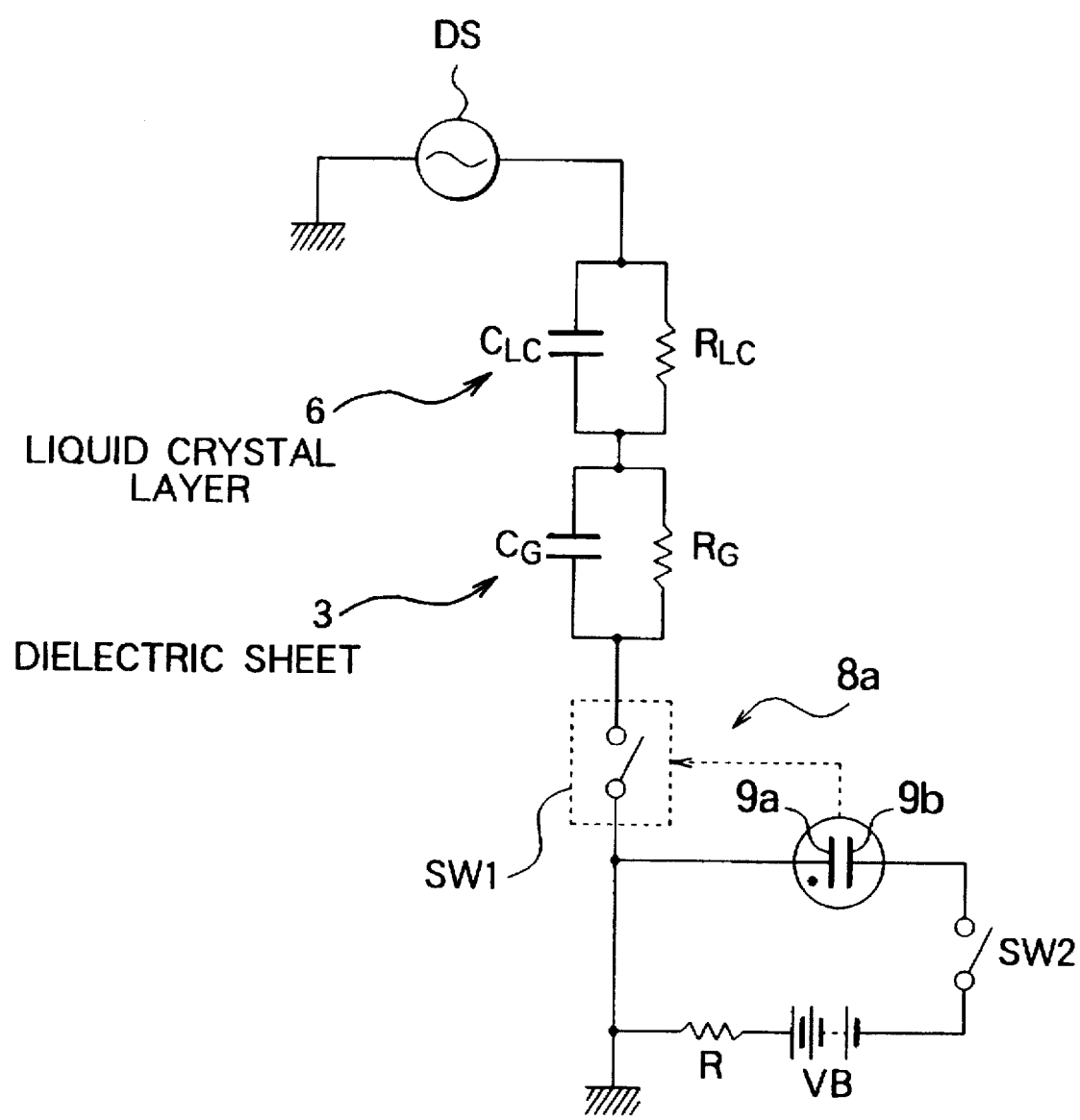
FIG. 10 is a view showing an equivalent circuit of one pixel's worth of the plasma addressed display device shown in FIG. 6.

For example, where a voltage "−300V" is applied to the column electrode 19b corresponding to the plasma chamber 18b and, at the same time, a voltage "−80V" is applied to the data electrode 15, in the plasma addressed display device 100 mentioned before, as in FIG. 9(B), the electric field in the plasma chamber 8b is weakened by the voltage "−80V" of the data electrode 5 and so the plasma discharge was suppressed, but in the plasma addressed display device 21 shown in FIGS. 1 and 2, the electric field of the plasma chamber 18b is determined mainly by the potentials of the column electrode 19b and the transparent electrode film 32, and therefore the weakening of the electric field of the plasma chamber 18b by the voltage "−80V" of the data electrode 15 can be suppressed and the state of plasma discharge in the plasma chamber 18b can be stabilized.

Also, in the plasma addressed display device 21, after the discharge is terminated in the plasma chamber, the voltage which is finally held in the plasma chamber is determined by the action of the electric charge ionized from the semi-stable atoms. At this time, the voltage written in the dielectric sheet 13 reflects the electric field in the plasma chamber, but even during a period where, for example, the column electrodes 19a to 19c are switched from the cathode potential to the anode potential due to the existence of the transparent electrode film 32, irrespective of the type of the gas which is sealed in the plasma chamber, the writing in a state where the DC offset is superimposed on the data voltage can be avoided.

Further, in the plasma addressed display device 21, since the transparent electrode film 32 is formed on the entire surface of the glass substrate 17, when forming the transparent electrode film 32 in the manufacturing process it becomes unnecessary to perform the patterning and alignment steps.

Next, an explanation will be made of the configuration of the driving portion of the plasma addressed display device 21 shown in FIGS. 1 and 2.

FIG. 3 is a view of the configuration of the driving portion of the plasma addressed display device 21 on the flat plane side.

A video data DATA is supplied to a liquid crystal driver 51. From the liquid crystal driver 51, the data voltages DS1 to DSm of a plurality of pixels constituting the respective lines are simultaneously output for every horizontal period. These data voltages DS1 to DSm of a plurality of pixels are supplied to a plurality of data electrodes $15_1$ to $15_m$ via buffers $52_1$ to $52_m$, respectively.

The operation of the liquid crystal driver 51 is controlled by a control circuit 53. The control circuit 53 receives a horizontal synchronization signal HD and a vertical synchronization signal VD corresponding to the video data DATA as the synchronization reference signals. Also, the control circuit 53 controls the anode driver 54 and the cathode driver 55.

In the anode driver 54, an anode voltage "0V" is supplied as the reference voltage to the transparent electrode film 32 formed on the entire surface of the glass substrate 7 as shown in FIG. 1.

In the cathode driver 55, a cathode voltage having a predetermined difference from the anode potential is sequentially supplied to the column electrodes $19_1$ to $19_n$. Due to this, a plasma discharge is sequentially generated in a pair of plasma chambers 8 corresponding to the column electrodes $19_1$ to $19_n$ for every horizontal period, and a pair of plasma chambers 8 writing the data voltages $DS_1$ to $DS_m$ into the liquid crystal layer 16 shown in FIG. 1 at the pixels aligned in the column direction (the horizontal direction) are sequentially scanned in the row direction (the vertical direction).

Next, an explanation will be made of the cathode voltage applied to the column electrodes $19_k$ to $19_{k+3}$ and data voltages $DS_1$ to $DS_m$ applied to the data electrodes $15_1$ to $15_m$.

Figure 4A:
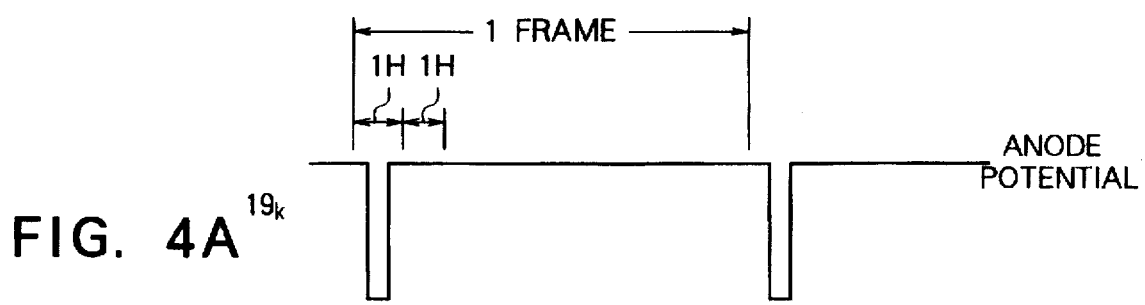
FIGS. 4A-4E are graphs for explaining a voltage to be applied to the column electrodes and data electrodes.
Figure 4B:
Figure 4C:
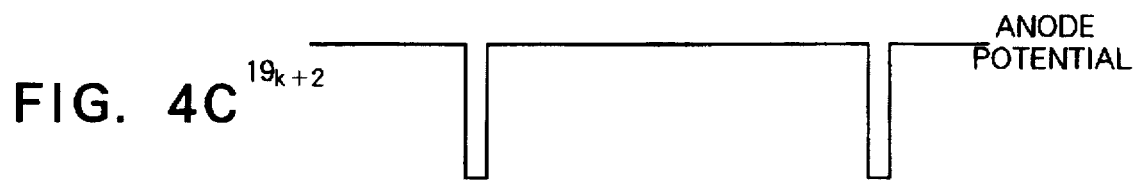
Figure 4D:
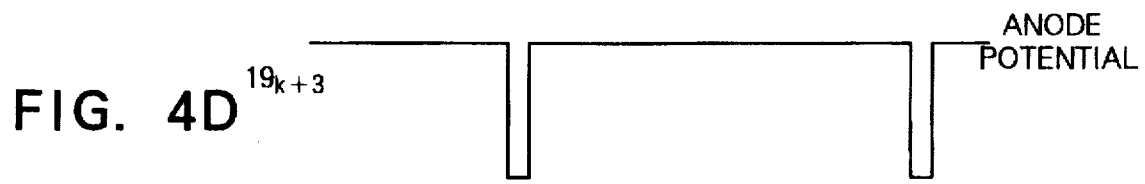
Figure 4E:
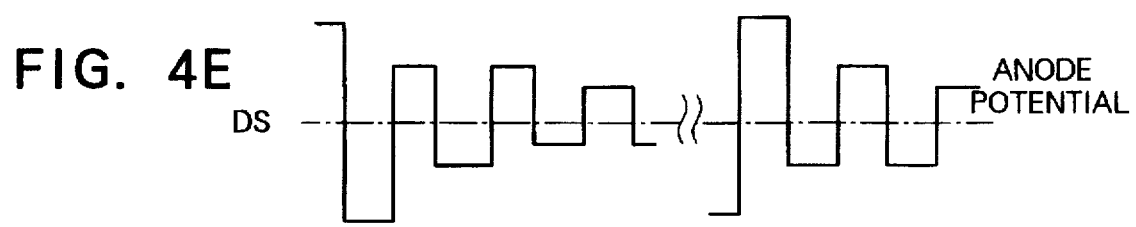

FIGS. 4(A) to 4(D) show cathode voltages $VK_K$ to $VK_{k+3}$ applied to the continuous column electrodes $19_k$ to $19_{k+3}$, respectively, and FIG. 4(E) shows the data voltage DS to be applied to the predetermined data electrode 15.

To the column electrodes $19_k$ to 19k+3, the cathode voltages $VK_k$ to $VK_{k+3}$ having a predetermined potential difference from the anode potential are respectively applied in each continuous horizontal period (1H) for every frame. Due to this, the plasma chambers 8 generating the plasma discharge are sequentially scanned in the row direction (the vertical direction). Also, the data voltage DS is inverted in polarity with respect to the anode potential for every horizontal period and every frame and the liquid crystal layer 16 is, thus, alternately driven.

Figure 7:
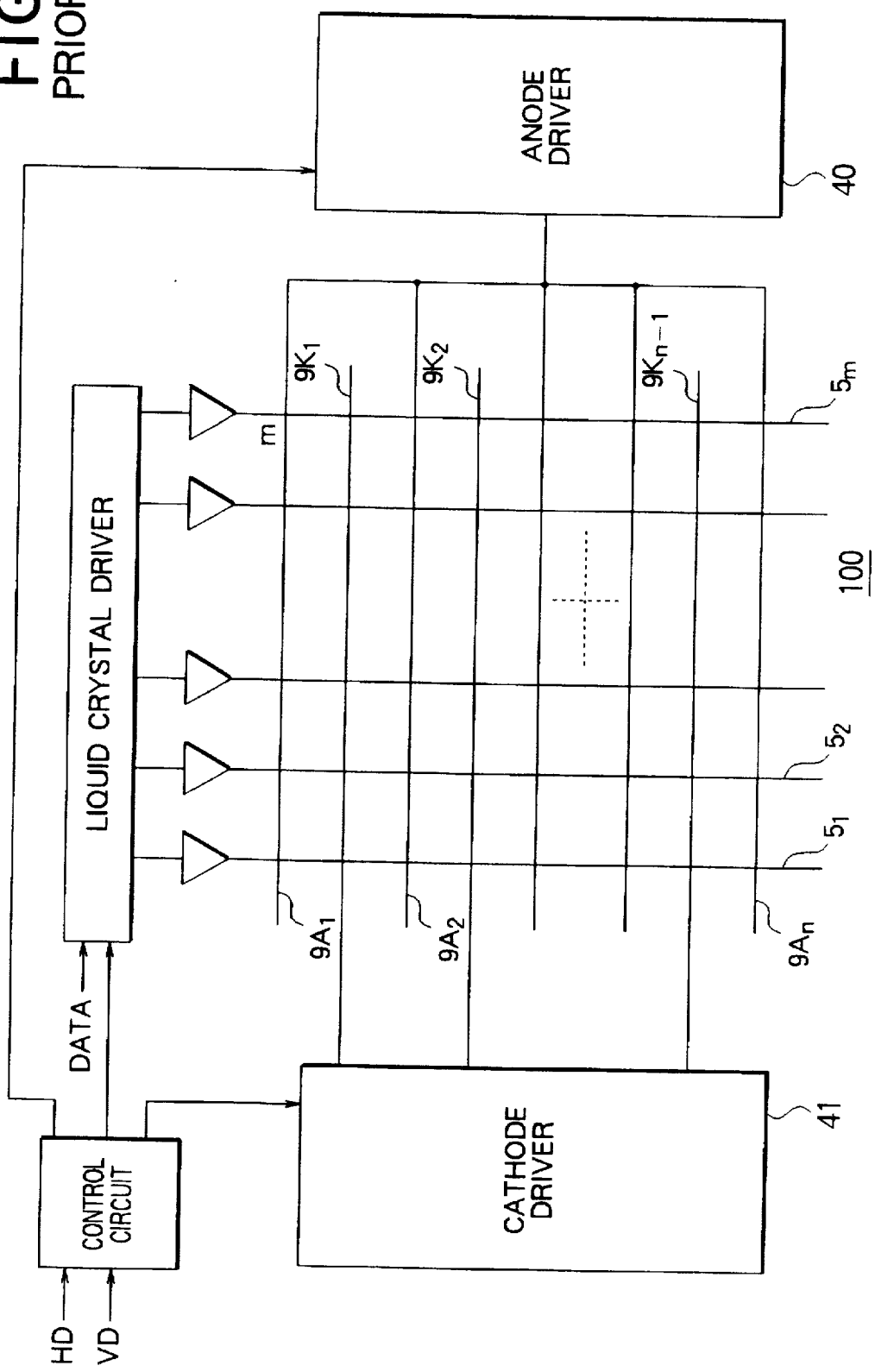
FIG. 7 is a circuit diagram for explaining the driving portion of the column electrodes of the plasma addressed display device shown in FIG. 6.
Figure 8:
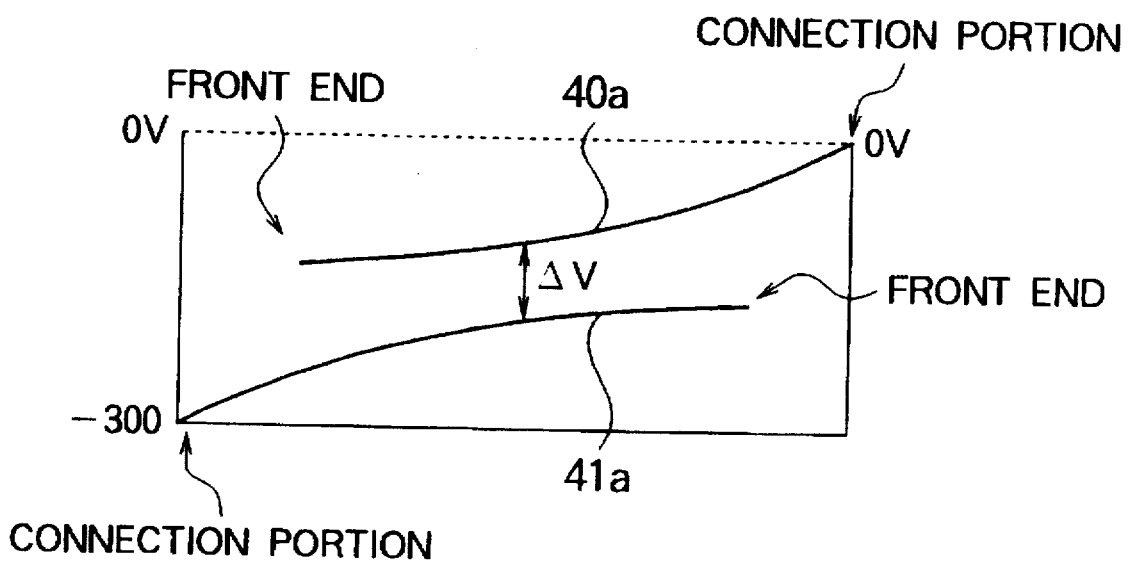
FIG. 8 is a graph for explaining the voltage drop in a cathode electrode and an anode electrode.

According to this plasma addressed display device 21, since, as shown in FIGS. 1 and 3, the transparent electrode film 32 is formed on the entire surface of the glass substrate and only the column electrodes 19a to 19n are formed in the form of stripes, in comparison with the driving portion of the plasma addressed display device 100 shown in FIG. 7, the configuration of the driving portion can be simplified. Namely, in the plasma addressed display device 21, since the terminal of the transparent electrode film 32 is provided outside of the valid pixel region as shown in FIG. 2 and, at the same time, the transparent electrode film 32 is formed on the entire surface of the glass substrate 17, the resistance value in the supply of the anode voltage can be reduced and the voltage drop of the anode voltage supplied from the transparent electrode film 32 can be greatly reduced by this simple configuration. Note that, since the transparent electrode film 32 is formed in the valid pixel region, a discharge current flows also in a direction orthogonal to the plasma chamber, but the voltage drop in the orthogonal direction is merely about 0.5V where the surface resistance of the film is 10 $\Omega/\square$, the vertical and lateral ratio of the glass substrate 17 is 1:1 (i.e. the glass substrate is square), and the discharge current is 100 mA. For this reason, even in a case where the device is large in size, the resistance value in the supply of the anode voltage can be suppressed to a small value.

By contrast, if the transparent electrode film that serves as the anode electrode is formed in the valid pixel region of the plasma chamber with a stripe-like pattern having a surface resistance of 10$\Omega/\square$, a width of 0.5 mm, and a length of 300 mm, the electrode resistance per line is 6 k$\Omega$, and if a DC (direct current) discharge is carried out and the discharge current of 100 mA flows, where the current density is uniform, the resulting voltage drop between the connection portions of the driver and the end portions of the electrodes is about 300V.

Therefore, in the plasma addressed display device 21, the voltage drop in the direction orthogonal to the plasma chambers can be greatly reduced.

The present invention is not restricted to the above embodiment. For example, in the above embodiment, a case where the transparent electrode film 32 was formed on the entire surface of the glass substrate 17 was used as an example, but in the present invention, it is also possible to divide the film to a plurality of regions including a plurality of column electrodes and form a plurality of transparent electrode films 32 on the glass substrate 17.

Also, in the above embodiment, a direct current discharge type plasma addressed display device was used as an example, but the present invention can be applied also to an alternate current discharge type plasma addressed display device.

Figure 5:
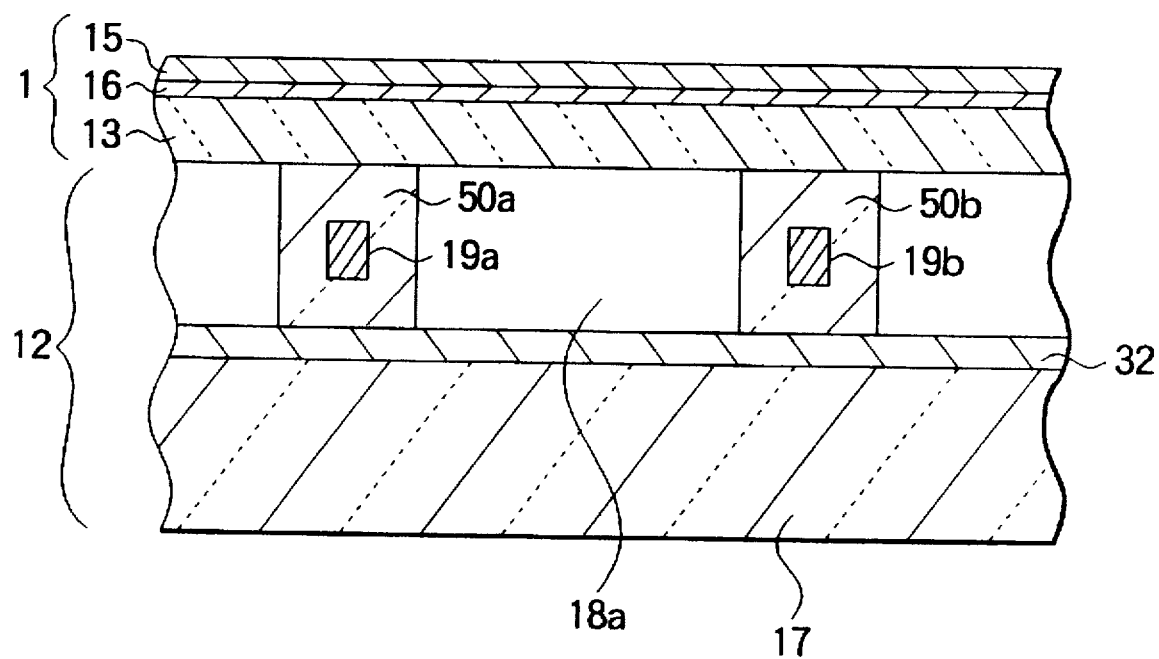
FIG. 5 is a view of the cross-sectional configuration of an alternating current discharge type plasma addressed display device according to another embodiment of the present invention.
Figure 6:
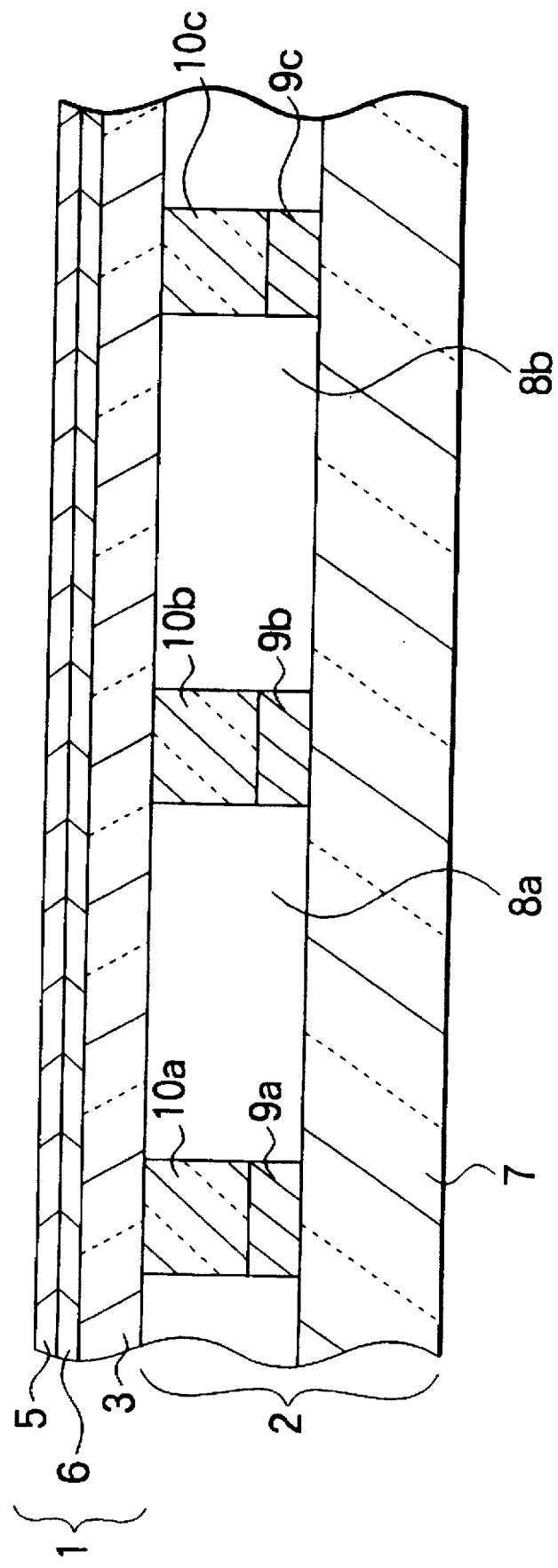
FIG. 6 is a view of the cross-sectional configuration of a conventional plasma addressed display device.

FIG. 5 is a view of the cross sectional of a configuration of an alternate current discharge type plasma addressed display device according to another embodiment of the present invention.

In FIG. 5, parts corresponding to those of FIG. 1 are given the same reference characters.

In the plasma addressed display device shown in FIG. 5, stripe-like insulation layers, or ribs 50a and 50b are formed at predetermined intervals between the transparent electrode film 32 and the dielectric sheet 13.

The column electrodes 19a and 19b are respectively embedded in the insides of the insulation ribs 50a and 50b, so the column electrodes 19a and 19b are not exposed in the plasma chamber 18a. In the plasma chamber 18a of the plasma addressed display device shown in FIG. 5, the column electrodes 19a and 19b serve as the cathode electrodes, the transparent electrode film 32 serves as the anode electrode, and the alternate current type plasma discharge is generated in the plasma chamber 8a.

In the plasma addressed display device shown in FIG. 5, since the column electrodes 19a and 19b are embedded in the insulation layers, or ribs, 50a and 50b, sputtering of the electrodes at the time of discharge is suppressed, so that the service life of the column electrodes 19a and 19b is lengthened, and also the voltage drop along the electrodes is suppressed. Also, since the discharge utilized in this embodiment is an alternate current discharge, there is little adverse influence of plasma light due to the discharge on the screen.

Also, according to the plasma addressed display device of the present invention, the configuration of the driving portion can be made simple.

Further, according to the plasma addressed display device of the present invention, at the time of the writing of the data voltage, the superimposition of a DC offset is prevented or reduced.

The preferred embodiment of the transparent electrode film 32 is a sheet formed over substantially the entire surface of the substrate. However, an embodiment of the invention is contemplated wherein the transparent electrode film 32 extends over less than the entire surface of the glass substrate. For example, the transparent electrode film may extend over most but not all of each pixel area. In one variation, the transparent electrode film may extend at least partially beneath each second, or cathode, electrode. Another variation provides that the transparent electrode film may extend at least partially beneath each of the insulating ribs or stripes. Yet another variation provides that at least part of each of the insulating ribs or stripes is disposed between the transparent electrode film and the cathode electrode.

Although other modifications and changes may be suggested by those skilled in the art, it is the intention of the inventors to embody within the patent warranted hereon all changes and modifications as reasonably and properly come within the scope of their contribution to the art.

I claim:

1. A plasma addressed electro-optical display device, comprising:

a first substrate having a major surface;

a transparent electrode formed on said major surface of said first substrate;

a plurality of parallel first electrodes provided on said transparent electrode and insulated from said transparent electrode;

a second substrate having a plurality of second electrodes extending perpendicularly to said first electrodes, and disposed with said second electrodes facing said first electrodes;

a potential setting sheet provided between said first and second substrates;

a plurality of stripe-shaped insulation layers between said transparent electrode and said potential setting sheet;

a plurality of plasma chambers formed between said first substrate and said potential setting sheet;

a discharge gas sealed in said plurality of plasma chambers for plasma ignition by voltages applied between said transparent electrode and said first electrodes; and an electro-optical layer between said potential setting sheet and said second substrate.

2. A plasma addressed electro-optical display device as claimed in claim 1, wherein said potential setting sheet is a dielectric sheet.

3. A plasma addressed display electro-optical device as claimed in claim 1, wherein said transparent electrode and said plurality of first electrodes serve as anodes and cathodes in said plurality of plasma chambers.

4. A plasma addressed electro-optical display device as claimed in claim 1, wherein a distance between said first electrodes and said transparent electrode is shorter than a distance between said first electrodes and said second electrodes.

5. A plasma addressed electro-optical display device as claimed in any claim 1, wherein said transparent electrode is formed on substantially the entire major surface of said first substrate.

6. A plasma addressed electro-optical display device as claimed in claim 1, further comprising:

a voltage supply for supplying a reference voltage to said transparent electrode for driving said electro-optical layer.

7. A plasma addressed electro-optical display device as claimed in claim 1, wherein said first electrodes and said plurality of stripe-shaped insulating layers are formed by printing.

8. A plasma addressed electro-optical display device as claimed in claim 1, wherein said wherein said first electrodes are exposed to said discharge gas in said plasma chambers for direct current driving of said discharge gas.

9. A plasma addressed electro-optical display device as claimed in claim 1, wherein said first electrodes are embedded inside said stripe-shaped insulation layers for alternating current discharge of said discharge gas.

10. A plasma addressed electro-optical display device as claimed in claim 1, further comprising:

a seal between said first substrate and said potential setting sheet to seal said plasma chambers, and said transparent electrode extending at least to said seal.

11. A plasma addressed electro-optical display device as claimed in claim 1, wherein said transparent electrode extends at least partially beneath said first electrodes.

12. A plasma addressed electro-optical display device as claimed in claim 1, wherein said transparent electrode extends at least partially beneath said stripe-shaped insulation layers.

13. A plasma addressed electro-optical display device as claimed in claim 1, wherein at least part of said stripe-shaped insulation layers is disposed between said transparent electrode and said first electrodes.

* * * * *